United States Patent [19]

Chaumont et al.

[11] Patent Number: 5,058,437
[45] Date of Patent: Oct. 22, 1991

[54] DETERMINING THE QUANTITY YIELD OF A COMPRESSIBLE FLUID FLOWING THROUGH A PRESSURE REDUCING VALVE

[75] Inventors: Claude Chaumont, Villetaneuse; Denis W. Waroux, Saint Martin du Tertre; Paul Bonneric, Aubervilliers; Jannin Bernard, Tournan en Brie, all of France

[73] Assignee: Gaz de France, Paris, France

[21] Appl. No.: 411,139

[22] Filed: Sep. 22, 1989

[30] Foreign Application Priority Data

Sep. 23, 1988 [FR] France ................... 88 12490

[51] Int. Cl.⁵ .............................................. G01F 1/66
[52] U.S. Cl. ................................. 73/861.21; 364/510
[58] Field of Search .......... 73/592, 570, 861.18, 73/861.19, 861.21, 861.74; 364/510, 571.01, 571.07

[56] References Cited

U.S. PATENT DOCUMENTS

| | | | |
|---|---|---|---|
| 3,218,852 | 11/1965 | Scarpa et al. | 73/861.24 |
| 4,297,607 | 10/1981 | Lynnworth et al. | 73/861.21 |
| 4,550,615 | 11/1985 | Grant | 73/861.21 |
| 4,875,932 | 10/1989 | Uchiyama et al. | 73/861.74 |

FOREIGN PATENT DOCUMENTS 0104004  3/1984  European Pat. Off. .
3301855  7/1984  Fed. Rep. of Germany .

OTHER PUBLICATIONS

Patent Abstracts of Japan, vol. 8, No. 86 (P-269) [1523], Apr. 19, 1984; and JP-A-59 3216.

*Primary Examiner*—John E. Chapman
*Assistant Examiner*—Louis M. Arana
*Attorney, Agent, or Firm*—Pollock, Vande Sande & Priddy

[57] ABSTRACT

The invention is intended for determining the quantity yield of a compressible fluid flowing through a conduit which is provided with a pressure reducing valve. According to the invention, this determination is made by using a vibration sensor which is subjected to vibrations from the pressure reducing valve, and at least one pressure sensor mounted upstream of the valve. The signals emitted by the vibration sensor are processed in a processing unit. These processed signals and the signals emitted by the pressure sensor are digitalized in an analog to digital converter unit, and then sent to a computer, which, using the data previously stored in its memory unit, outputs a value corresponding to the quantity of fluid. The invention is particularly designed for use in measuring the quantity yield of a combustible gas.

8 Claims, 3 Drawing Sheets

DETERMINING THE QUANTITY YIELD OF A COMPRESSIBLE FLUID FLOWING THROUGH A PRESSURE REDUCING VALVE

FIELD OF THE INVENTION

This invention specifically comprises a procedure and an apparatus allowing an operator to determine the quantity yield of a compressible fluid such as a combustible gas flowing through a conduit, where the conduit has a pressure reducing valve for the fluid or gas.

BACKGROUND OF THE INVENTION

At present, there are a number of instruments designed to measure liquid and gas yields. But these instruments are usually very specialized, requiring a level of calibration that is often difficult to attain, and more importantly demanding the presence of a supporting element for the probe or sensor extending into the fluid. For this reason, an opening in the wall of the conduit must be made, and different methods must be used to ensure air and watertightness, under pressure conditions which may exceed 100 bar, often with inflammable or chemically aggressive, and hence dangerous, gases. In addition, many of these instruments for measuring yield are costly, thus limiting their usefulness in the field.

In addition, the technician who wishes to know the amount of global consumption in a linked consumer network sharing a pressure reduction station is often reduced, these days, to listening "by ear" to the sound emitted by the pressure reducing valve in order to estimate the circulating gas yield. Since the intensity of the sound increases with the yield, this operation depends entirely on the sensitivity of the technician's hearing.

Such an evaluation is even more subjective in that the overall sound varies as a function of the pressure upstream of the pressure reducing valve compared to the pressure downstream of the valve, as a function of the temperature and nature of the fluid in circulation, and also as a function of the geometry of the pressure reducing valve and the conduits connected to it.

This last point is particularly important, since many manufacturers have recently come out with "silent" pressure reducing valves which disperse jets of fluid, thereby altering the resonance levels and the emission range of the sounds involved. Under such conditions, evaluating the yield of the product becomes a matter of blind chance.

SUMMARY OF THE INVENTION

This invention is intended to resolve these difficulties by proposing a system which rationalizes, as it were, the sound which is characteristically emitted by a pressure reducing valve and by the fluid during the pressure reduction operation.

We focus first of all on the procedure, included in the invention, by which an operator is able to measure the yield of gas by extending a measuring device into the conduit.

According to the invention, this procedure is made up of the following steps, determined by means of experiments made in a preoperational phase:

a) for a more or less constant pressure difference upstream and downstream of the pressure reducing valve, and for the several yield values which have been determined for the fluid passing through the valve, the electrical signals corresponding to the values given by a vibration sensor sensitive to the vibrations caused by the pressure reducing valve are measured, b) the measurement is repeated to find different values for the upstream pressure, and c) the data for these signal measurements are stored in a computer memory unit. Then, in the operational phase:

d) the electrical signals giving the values for i) the pressure recorded upstream of the pressure reducing valve, the downstream pressure remaining constant, and ii) the vibration caused by the fluid circulating in the pressure reducing valve are entered into the computer, so that e) the computer gives as output the yield value for the fluid as a function of the data stored in memory.

In the procedure described above, it should be noted that the pressure downstream of the pressure valve is assumed to be constant. In practice, however this pressure may vary somewhat. In order for the operator to obtain a more "refined" result, therefore, this variation in pressure may be taken into account. In such a case, during the operational phase where step d) is replaced by a step in which information giving i) the difference in pressure upstream and downstream of the pressure valve, and ii) as before, the vibration caused by the fluid circulating in the pressure reducing valve is entered into the computer.

In addition to this procedure for measuring yield, the invention also comprises an apparatus which allows the procedure to take place under very efficient conditions. The major feature of this apparatus is its ease of use, since it does not require the penetration of the conduit by a yield sensor.

Specifically, according to one method of construction, the yield indicator apparatus in this invention is made up of the following parts:

a vibration sensor placed near the pressure reducing valve. The sensor is attuned to the valve vibrations, and registers the vibrating waves emitted by the valve. The sensor houses a transducer, e.g. piezoelectric, which is capable of transforming the waves emitted by the pressure valve into an electric signal;

a processing unit for the signal sent by the vibration sensor. This unit consists of a primary amplifier for receiving the signal sent by the transducer, a threshold detector which fixes the threshold reference for the signal at zero, a first pass-band filter, a second amplifier, a second pass-band filter, a third amplifier, a pulse shaper circuit serving as a rectifier for the signal, and an output amplifier;

a pressure sensor mounted on the conduit upstream of the pressure reducing valve, able to transform the measured pressure into an electric signal;

an analog to digital unit which receives the electric signal sent by the vibration and pressure sensors respectively and transforms these signals into digital data;

and a digital computer designed to receive the data given by the analog to digital unit. With pressure downstream of the pressure valve assumed to be constant, and given the pressure differential upstream and downstream of the valve, the computer will output a value corresponding to the yield, as a function of the values measured upstream of the valve and of the vibrating wave emitted by the valve.

In this way an indication of yield is obtained when the pressure downstream of the valve is assumed to be constant.

Since the operator may wish to take into account variations in pressure downstream of the valve (as has been stated, some small variations do occur), a variant construction design for the invention is also given. In this variant design, the "simple" absolute pressure sensor mounted upstream of the pressure reducing device is replaced by a differential pressure sensor mounted onto the conduit. This sensor records the difference in pressure upstream and downstream of the pressure reducing valve.

In this way, the digital computer always makes use of a known pressure differential in its calculations.

From a practical point of view, it should be pointed out once again that, in order to accommodate existing designs for pressure reducing valves, the invention's processing unit for the signal emitted by the vibration sensor filters the signal for an ultrasonic frequency band, approximately 15 to 25 KHertz.

In addition to the apparatus just described, the invention also consists of the vibration sensor utilized in this apparatus.

According to the invention, this sensor is designed to be mounted on a conduit through which flows a compressible fluid, such as a combustible gas. The conduit is provided with a pressure reducing valve for this fluid. The sensor has the following features:

a head, used to attach the sensor to the conduit near the pressure valve, in such a way that the head receives the vibrations emitted by the pressure valve;

a transducer, e.g. piezoelectric, mechanically attached to the sensor head;

an output terminal, such as a coaxial plug, linked to the transducer by an electrical conductor wire;

and a metal frame in the shape of a sleeve tube, in which is placed the transducer. The frame serves as a mass for the transducer.

One problem which arose during experimentation on the functioning of the sensor was the presence of parasitic vibrations coming especially from "street noise." These parasitic vibrations were all the more serious in that the entire apparatus and especially the vibration sensor would most often be used in an urban environment where there are many of these parasitic noises (from automobiles, subways, etc.).

In order to avoid the harmful effects of these vibratory perturbations, it is possible in the invention to mechanically link the sensor transducer to an electrically conducting feeder head which is mechanically isolated from the sensor frame. This feeder head forms a metal element which can absorb the vibrations received by the transducer when the frequency of the vibrations is below a given value, for example 1,000 hertz. In this way, the transducer is not excited unless the frequency is above this given value.

The feeder head therefore serves as a mechanical reference for the range of frequencies capable of exciting the transducer.

BRIEF DESCRIPTION OF THE DRAWINGS

The design of the invention, as well as its characteristics and advantages, will be shown more clearly in the following description and in the accompanying diagrams, in which:

FIG. 4 shows the vibration sensor transducer, the pressure sensor, the processing unit for the vibration signal, the analog to digital unit which receives data sent by the vibration and pressure sensors, and, at the end of the chain, the computer which calculates the yield;

DETAILED DESCRIPTION OF THE INVENTION

Figure 1:
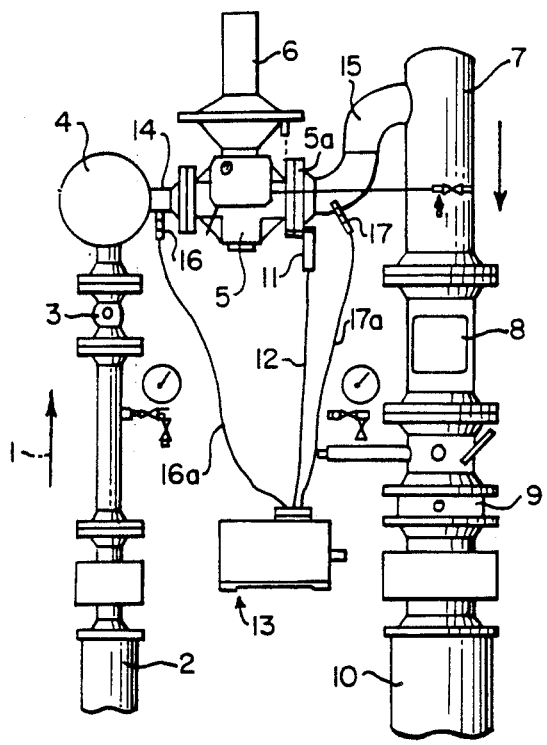
FIG. 1 illustrates schematically a conventional station for pressure reduction and metering, utilized on a combustible gas network; and a device of the invention connected to the station for indicating the yield.

Looking first at FIG. 1, one sees the pressure reducing station as is usually found in combustible gas distribution networks for consumption by end users.

Moving in the direction shown by the arrow 1, this station is comprised of a gas feeder conduit 2, an entry valve 3, a filter 4, a pressure reducing valve 5, equipped with a regulator 6, a linking channel 7, a meter 8, and an output valve 9, attached to the end user's gas distribution conduit 10.

According to the invention, on the outside of one of the flanges 5a of the pressure reducing valve 5 is fixed a vibration sensor 11 linked by electrical cable, such as a coaxial cable 12, to an analysis station 13, to be discussed later.

Again, it should be noted that in FIG. 1, the pressure sensors 16 and 17 are mounted upstream and downstream of the pressure valve 5 on the length of pipe forming the channels 14 and 15, respectively. These pressure sensors are designed to send to the analysis station 13 data on the pressure of the fluid upstream and downstream of the pressure valve, by means of the electrical linking cables 16a and 17a respectively.

It may be seen that even if the downstream pressure sensor 17 turns out to be useful, it is not absolutely indispensable, since during operation one can still achieve a good approximation by considering the pressure to be constant downstream of the pressure valve on the gas distribution network.

Figure 2:
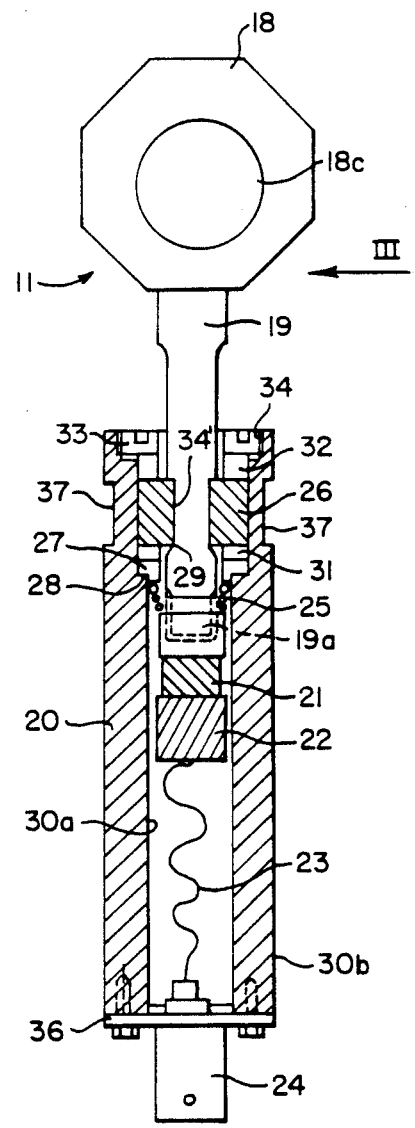
FIG. 2 is a partial view, longitudinal cut, of the vibration sensor as provided for in the invention, installed near the pressure reducing valve and attuned to the valve vibrations.

FIG. 2 shows a more detailed illustration of the design for the vibration sensor 11.

As it is shown here, the sensor 11 consists of a metal head 18, (in the model, made of non-oxidizing steel) which receives the vibrations emitted by the pressure reducing valve 5 and the circulating fluid. The head also allows the sensor to be suspended in such a way that it can receive these vibrations.

The head 18 extends by means of a rod 19 into the interior of the sensor frame 20. Inside the frame there is a transducer 21, mechanically attached to the rod 19 (e.g. by welding). The transducer consists of a piezoelectric ceramic chip, linked to a metal feeder head 22 on the side opposite to the rod 19. Also connected to the feeder head is an electric jumper 23, attached on its other end to the sensor's output terminal 24. In the model this output terminal is formed by the fixed connector of a coaxial plug. A locking plate 36 assures an air- and watertight assembly of the plug to the frame 20.

Taking into account the often rigorous use conditions which the sensor may encounter, it is recommended that the piezoelectric chip be coated by an impermeable plastic film to protect the ceramic and its contacts from dampness.

As is clearly shown in FIG. 2, the sensor frame 20 is in the shape of a sleeve tube. This allows the placement not only of part of the rod 19 and the transducer chip 21 with its feeder head 22, but also of a metal spring 25 and an elastic joint 26, made of hard rubber, for example. Once the sensor has been suspended, the spring 25 is compressed between one shoulder 29 of the rod 19 (the rod being screwed in at the level of the shoulder by means of a screw thread 19a) and a metal washer 27. The washer 27 presses against a shoulder 28 formed out of the interior wall 30a of the frame 20.

Another washer 31, made for example of Nylon (registered trademark) presses against the opposite face of the washer 27. The washer 31, together with the Nylon washer 32, frames the joint 26 to ensure its compression, caused by a ring nut 33 screwed onto an interior screw thread 34 at the upper end of the frame 20. Two flat indentations 37 made in the exterior wall 30b of the frame 20 facilitate the screwing and unscrewing of the ring 33.

One should note that to ensure continued use the joint 26 should connect with the rod at the area where the rod is locally contracted on its periphery, shown at 34'.

Given this arrangement, when the spring 25 is compressed and the sensor is suspended by its head 18, on a pressure valve flange for example, the vibration transmitting rod 19, the transducer, and the feeder head are in complete connection with the frame 20, although they are mechanically and electrically linked to it only through the spring 25, so that the joint 26 under vibratory isolation keeps the rod and the sensor frame from metal-metal contact.

In this way, vibrations, and in particular high frequency (ultrasonic frequency) vibrations, coming from the pressure reducing valve are transmitted to the ceramic chip 21 without being "short-circuited" or perturbed by the frame 20. In this way, the sensor frame serves as an electrical ground for the transducer as well as protecting against radio-electric parasities.

At this stage in the description, it is important to look more closely at the role of the feeder head 22. For best effect, the feeder head is attached to the piezoelectric chip 21. In the course of experimentation, the feeder head was found to be particularly useful, in that, having a determined mass, it could free the sensor from many of the parasitic vibrations which impeded the sensor's operation the most: low frequency vibrations (generally less than 1,000 Hertz), due mostly to "street noise" (automobile traffic, vibrations from construction work, etc.).

As shown, when the sensor 11 is in operation the feeder head 22 absorbs vibration frequencies lower than a given threshold. In this way it serves as a kind of mechanical high-pass filter with a frequency cut-off corresponding to the minimum threshold for vibrations which might be emitted by the pressure valve on which the sensor is mounted.

Figure 3:
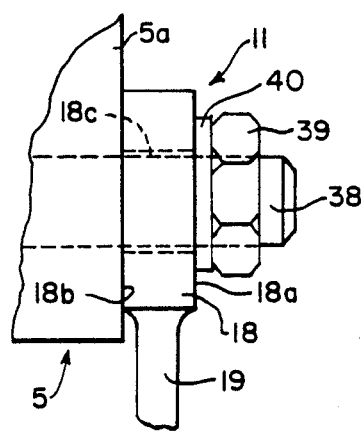
FIG. 3 is a partial view of FIG. 2 in the direction indicated by the arrow III, showing the sensor mounted on a flange.

Turning briefly to FIGS. 2 and 3 for comparison, the following paragraph describes one design for the part which forms the head 18 of the sensor 11.

As shown, this head 18 can be seen as a kind of multiplane washer, consisting of two opposing plane faces 18a and 18b (FIG. 3), as well as a central orifice 18c. As shown in FIG. 3, this design makes possible the suspension of the sensor assembly 11 onto one of the flanges of the pressure valve, by attaching the head 18 to a spindle 38 on the flange. Closing takes place by means of a nut 39/ washer 40 assembly, which ensures that the sensor is tightly fixed to the pressure valve. In this way the sensor is spared any untoward movement caused by parasitic vibrations.

Figure 4:
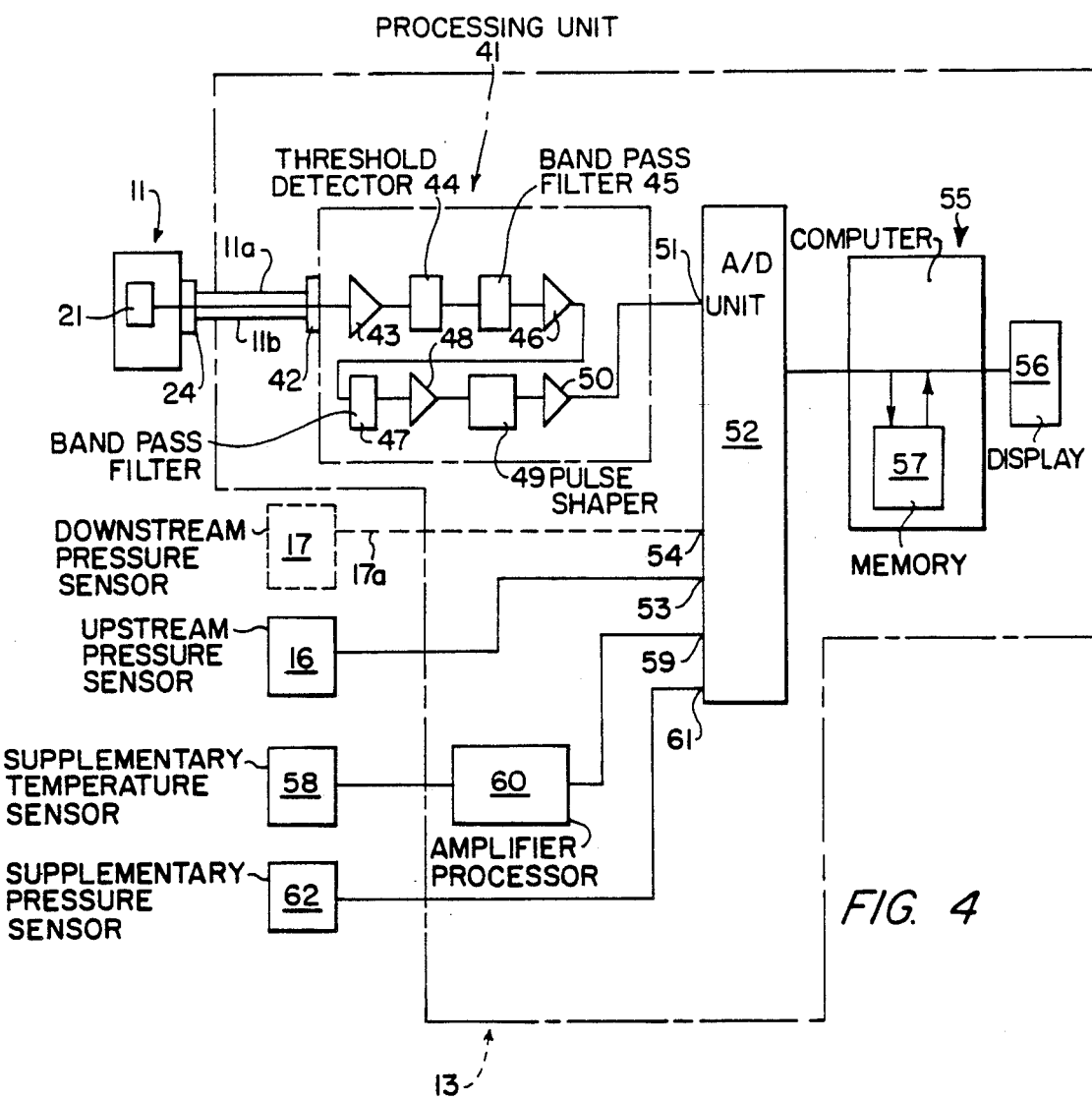
FIG. 4 is a general schematic showing the electrical system which makes possible the utilization of the yield indicating device shown in FIG. 1.

In FIG. 4, the apparatus in the invention has been drawn in the form of a general schematic. Given an input of data from the vibration sensor 11 and the upstream pressure sensor 16 and downstream pressure sensor 17 (if required), this apparatus outputs a measure of the quantity of fluid flowing through the pressure valve.

It should be noted that in FIG. 4 the downstream pressure sensor 17 and its connection cable 17a have been drawn with dotted lines since this sensor is not required so long as a constant downstream pressure is assumed. (Such an assumption gives a good approximation.)

As shown, the vibration sensor 11 on the pressure reducing valve 5 is connected to a processing unit 41 for the electrical signals emitted by the transducer 21. The connection is made by means of an electrical connection cable 11a, attached on one end to the terminal 24 of the sensor and on the other end to the entry terminal 42 of the unit 41. The wire 11a would, in practice, be protected by a shield tied to the electrical ground of the sensor 11 and to that of the unit 41.

This processing unit processes the signal by filtering it through a range of frequencies. This allows it to identify vibrations coming from all pressure reducing valves now in use. On the basis of these presently-operating valves, the vibrations are found to be in the ultrasonic frequencies, between approximately 15 and 25 KHertz.

Figure 5:
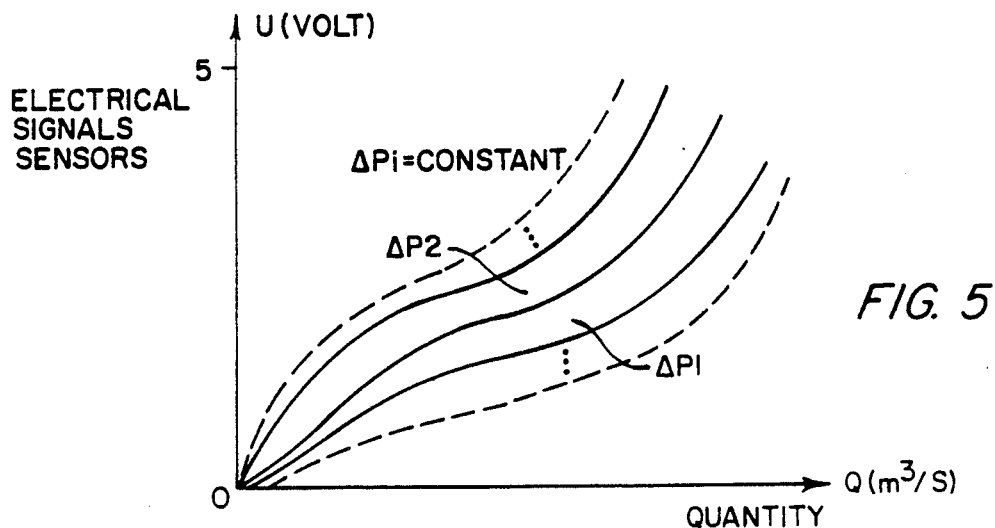
FIG. 5 shows, in the form of a graph, the data held by the computer in memory during the operation of the apparatus.

As illustrated in FIG. 5, the processing unit 41 for this purpose has an high impedance input amplifier 43 which receives and amplifies the signal emitted by the transducer 21. Once amplified, this signal passes through a threshold detector 44 which sets the reference threshold for the amplified signal to zero. The signal then passes through a pass-band filter 45 in order to be amplified once again by a second amplifier 46, then filtered by a second pass-band filter 47 (functioning on the same frequency band as the filter 45), before being once again amplified by a third amplifier 48, then rectified and transformed into rectangular pulses by a pulse shaper 49. The signal is then amplified a final time by an output amplifier 50 which stabilizes the signal.

Once it has left the amplifier 50, the processed signal enters a analog to digital signal acquisition unit 52 through an input terminal 51.

This analog to digital unit also receives electrical measurement signals transmitted from the upstream pressure sensor 16 through an input terminal 53, and, when necessary, signals transmitted from the downstream pressure sensor 17 through a third input terminal 54.

Once the signals emitted by the various sensors have been digitalized in the acquisition unit 52, they are transmitted sequentially and separately to a digital computer 55, which presents output on the display unit 56. For a difference in pressure upstream and downstream of the pressure reducing valve, the output gives the quantity of fluid circulating through the valve as a function of a certain number of values. These values had been measured in experiments conducted previous to the operation of the apparatus and stored in a memory unit 57 of the computer 55.

FIG. 5 shows a graphic representation, in the form of a set of curves, of the data which are stored in the memory unit 57. The graph shows on the x axis the quantities of fluid circulating through the pressure reducing valve and on the y axis the values determined under tension (for example between 0 and +5 volts) for the electrical signals sent by the sensors 11 and 16 (and 17, when used) to the acquisition unit 52 input terminal.

From FIGS. 4 and 5, it is possible to understand the principle underlying the procedure used in the invention to calculate the quantity of fluid flowing through a conduit.

Before the system can be used operationally, it is first necessary to enter the data necessary for the calculations into the memory 57 of the computer 55.

In order to do this, it is necessary to carry out a stage of experimentation, or calibration, before the apparatus is put into operation. During this stage, for a difference in constant pressure between the pressures upstream and downstream of the valve under examination and for known different quantities of fluid passing through this valve, the values of the electrical signals furnished by a vibration sensor sensitive to the vibrations of the valve, such as the sensor 11, are first measured. The measurement is then repeated for different pressure values determined upstream of the pressure valve.

If, in the course of a first approximation, the pressure downstream of the pressure valve is assumed constant, in order to take the measurements, only a simple sensor, such as the sensor 16, need be used to measure the pressure upstream of the pressure valve. The value of the pressure downstream of the valve being assumed constant, will then be entered into memory 57 as a reference value.

On the other hand, if one wants to take into account the slight variation in pressure downstream of the valve, as such variation might occur in use, then the upstream/downstream pressure sensors 16 and 17 are used. These sensors send to analog to digital acquisition unit 52 the electrical signals corresponding to a difference in pressure measured upstream and downstream of the pressure reducing valve. Once the electrical signals are digitalized they are entered into the computer 55 (see FIG. 4).

In general, it will be seen that the electrical signals transmitted by the vibration and pressure sensors are determined under tension. A voltmeter easily allows the signal values to be read as they leave the unit 41 or the sensor 16 (or 17), in order to be able to store them in the computer's memory.

To sum up, referring again to FIG. 5, during a first stage of experiments on a given pressure reducing valve, for different quantities q of fluid and for a series of differences in pressure also given and constant $p_i$, the values of the electrical signals are measured, for example by means of a voltmeter if the signals are determined under tension, as shown in FIG. 5.

Once the data underlying the graphic representation in FIG. 5 have been entered into a memory unit 57 of a computer, the system can be rendered operational.

Using, for example, the apparatus shown in FIG. 4, one enters into the computer 55 the data (electrical signals) on the pressure measured upstream of the pressure valve 5 (of the difference of pressures upstream and downstream of the valve) and on the vibration caused by the fluid circulating through the pressure valve. One then obtains, on a display unit 56, a value for the quantity of fluid in circulation as a function of the data stored in memory.

Based on the data in memory 57, the computer also shows on the display unit 56 a value for quantity Q given a tension U and a difference in pressure $p_i$.

At this stage in the description, it should be noted that the quantity measurement is usually calibrated at a temperature of 0° C. If further refinement of the results is desired, it is possible to determine by means of a supplementary temperature sensor 58 the actual temperature of the fluid circulating through the pressure reducing valve.

Once the signal from the temperature sensor 58 has passed through an amplifier-processor 60 specifically designed for temperature and well known in the field, it is then entered through an input 59 into an acquisition unit 52. When the signal has been digitalized, it is then taken into account in the calculations being made by the computer 55.

If desired, it is possible to improve even further the precision of the quantity values given by the computer by entering into the analog to digital unit 52, by a supplementary terminal 61, the values obtained by a supplementary pressure sensor 62. This sensor measures the actual atmospheric pressure in the region of the pressure valve, thus allowing the computer to take into account this supplementary pressure variable. Otherwise, the atmospheric pressure is assumed to be 1,013 bar.

Figure 6:
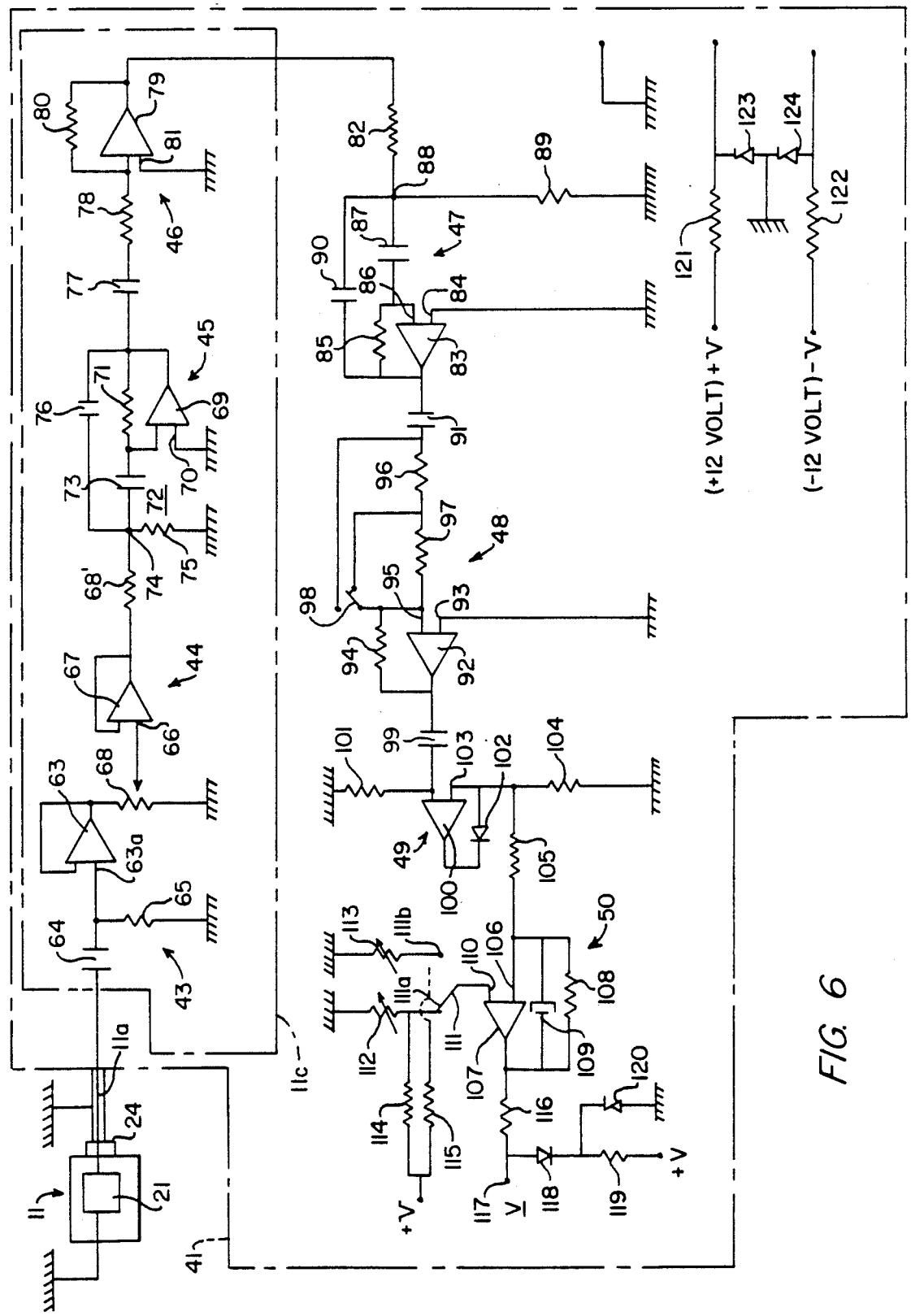
FIG. 6 gives a more detailed schematic illustration of a design model of the electronic circuit, provided for in the invention, used for the processing unit shown in FIG. 4.

Turning now to FIG. 6, one sees a diagram of the electronic circuit for the processing unit 41.

In classical manner, the input amplifier 43 is made up of a differential negative feedback amplifier, the input terminal 63 of which receives the signals emitted by the transducer 21 via a capacitor 64 and set to ground through a resistor 65.

An input terminal 66 on the differential negative feedback amplifier of the threshold detector 44 receives the signal issued from the output terminal from the amplifier 63 via a potentiometer 68 tied to the ground. The output from differential amplifier 67 passes through a resistor 68' to arrive at the first pass-band filter 45, which as has been stated preferably, covers the frequency band between approximately 15 and 25 kHertz.

The filter 45 is made up of a differential amplifier 69 with a grounded input terminal 70. The differential amplifier is provided with a negative feedback loop in the form of a resistor 71 linking the output terminal to the second input terminal 72 of the amplifier. The condenser 73 links this second input terminal in series to the output terminal of the amplifier 67 via the resistor 68'. The intermediate point between the two is grounded by the resistor 75 and is connected to the output terminal of the amplifier 69 by a condenser 76.

The output from the filter 45 passes through a linking condenser 77 and a resistor 78 to come out at the first input terminal of a differential amplifier 79, which is constructed similarly to the second amplifier 46 and provided with a negative feedback resistor 80 and grounded by its second input terminal 81.

One should note that this first section of the electronic circuit, serving as a preamplifier, is shielded from radio-electric parasitics by a metal box 11c.

The output from the second amplifier 46 travels to the second pass-band filter 47, passing through a resistor 82. This second filter is made up, like the first, of a differential amplifier 83 with a grounded input terminal 84. The differential amplifier is provided with a negative feedback loop in the form of a resistor 85 linking the output terminal to the second input terminal 86 of the amplifier 83. The condenser 87 links this second input terminal in series to the output terminal of the amplifier 46 via the resistor 82. The intermediate point between the two filters at node 88 is grounded by the resistor 89 and is connected to the output terminal of the amplifier 83 by a condenser 90.

The output from the second filter 47 travels to the third amplifier 48, passing through a condenser 91. This amplifier 48 is made up of a differential amplifier 92 with a grounded input terminal 93. The differential amplifier is provided with a negative feedback loop resistor 94 at its second input terminal 95, linked in series to the condenser 91 via the resistors 96 and 97, with a double relay 98 connected, depending on its position, to the terminals of either the resistor 96 or the resistor 97. In this way it is possible to vary the gain from the amplifier 48 by a factor of 10.

Upon leaving the amplifier 48, the signal reaches the pulse shaper (signal rectifier) circuit 49 via a condenser 99.

The circuit 49 is made up of a differential amplifier 100 with an input terminal connected to the condenser 99 and grounded by a resistor 101. The first output and second input terminals are connected by a negative feedback loop comprising a diode cathode 102 on the output side. The second input terminal 103 for the amplifier 100 is grounded by a resistor 104.

Upon leaving the amplifier 100, the signal passes through a resistor 105 to reach the input terminal of a differential amplifier 107 belonging to a fourth amplifier, or output amplifier, 50. This output amplifier is intended to adapt the impedance of the output and stabilize the signal.

The differential amplifier 107 is provided with a negative feedback loop between its first input terminal 106 and its output terminal, with a resistor 108 and, in parallel, a condenser 109.

The second input terminal 110 of the differential amplifier 107 is grounded by means of a relay 111 and, depending on the position of this relay, by a resistor 112 or a resistor 113, both resistors being variable. The output terminals 111a and 111b of the relay 111 and the resistors 112 and 113 respectively are also connected to the +V feeder tension by means of the resistors 114 and 115 respectively. This double potentiometric bridge serves in fact to set the output tension at zero in certain cases where the system is subjected to intense low-frequency noises.

The output terminal of the amplifier 107 delivers, through a resistor 116, a tension signal v which should optimally be established as a stabilized tension between 0 and +5 volts.

The anode of a diode 118 is connected between the signal output 117 and the resistor 116. The cathode of this diode is attached to the feeder tension +V through a resistor 119. A grounded Zener diode 120 is connected between the diode 118 cathode and the resistor 119.

This circuit is entirely classical with respect to its electronic signal feeder and signal input designs. For this reason, it is not necessary to describe it in detail. It is sufficient to note that it consists of the resistors 121 and 122 connected to each other by two Zener diodes 123 and 124 grounded at their midpoint by a contact 125.

Of course, the invention is not limited strictly to the designs described in detail above.

It should be clear that, in carrying out the procedure described in the invention, a vibration sensor different from the sensor 11 described above could be utilized. For example, a microphone or an acoustical probe, if correctly connected to the processing unit 41 could be used instead. So long as the new sensor is placed near the pressure reducing valve in such a way as to conveniently receive the vibratory waves emitted by the valve, the requirement is fulfilled. In such a case, a mechanical contact with the valve would no longer be necessary. Further, if the vibration sensor 11 is effectively utilized, the assembly design mounting it on the exterior wall of the downstream flange 5a of the pressure valve 5 is not by any means the only possibility. In fact, the only requirement is that the sensor must be placed in such a way as to be receptive to the vibrations coming from the pressure valve. Under these conditions, an exterior mounting on the upstream flange, or on one of the upstream or downstream conduits near the pressure valve would fulfil the function.

In addition, it should be clear that a differential pressure sensor could be used directly, in place of the upstream/downstream pressure sensors 16 and 17. Such a differential pressure sensor is well known to technicians in the field.

Indeed, the invention can also be used to indicate the quantities of compressible fluids other than combustible gas, such as compressed steam.

We claim:

1. A device for determining the flow of a compressible fluid through a conduit, said conduit being provided with a pressure reducing valve, said valve emitting vibrations when said fluid circulates therethrough, said device comprising:
    vibration sensor means for sensing the vibrations emitted by said valve;
    piezoelectric transducer means for transforming said sensed vibrations into an electrical signal;
    pressure sensor means connected to said conduit for sensing the fluid pressure upstream said pressure reducing valve and for transforming said sensed pressure into an electrical signal;
    converter means for receiving said respective electrical signals from said piezoelectric transducer means and said pressure sensor means, and for converting said respective electrical signals to digital data;
    memory means for storing reference data corresponding to a predetermined assumed constant pressure downstream said pressure reducing valve and values of electrical signals representative of vibrations emitted from said pressure reducing valve as a function of predetermined values of fluid flow and differences of fluid pressure upstream said pressure reducing valve; and
    computer means electrically connected to said memory means and receiving said data from said converter means, for outputting data corresponding to the flow of fluid to be determined, as a function of said reference data stored in said memory means.

2. A device for determining the flow of a compressible fluid through a conduit, said conduit being provided with a pressure reducing valve, said valve emitting vibrations when said fluid circulates therethrough, said device comprising:

vibration sensor means for sensing the vibrations emitted by said valve;

piezoelectric transducer means for transforming said sensed vibrations into an electrical signal;

differential pressure sensor means connected to said conduit for sensing the fluid pressure upstream and downstream said pressure reducing valve, respectively, and for transforming said sensed pressures into an electrical signal;

converter means for receiving said respective electrical signals from said piezoelectric transducer means and said differential pressure sensor means for converting said respective signals to digital data;

memory means for storing reference data corresponding to values of electrical signals representative of vibrations emitted from said pressure reducing valve as a function of predetermined values of fluid flow and differences of fluid pressures upstream and downstream said pressure reducing valve; and computer means electrically connected to said memory means and receiving said data from said converter means, for outputting data corresponding to the flow of fluid to be determined, as a function of said reference data stored in said memory means.

3. Device according to claim 1, further comprising: processing means including:

amplifier means for amplifying said electrical signal from said piezoelectric transducer means;

threshold means for setting a predetermined value for the reference threshold of said signal;

means for filtering said signal; and pulse shaper means for rectifying said signal and supplying said rectified signal to said converter means.

4. Device accordingly to claim 2, further comprising: processing means including:

amplifier means for amplifying said electrical signal from said piezoelectric transducer means;

threshold means for setting a predetermined value for the reference threshold of said signal;

means for filtering said signal; and pulse shaper means for rectifying said signal and supplying said rectified signal to said converter means.

5. A method of determining the flow of a compressible fluid through a conduit, said conduit being provided with a pressure reducing valve for emitting vibrations when said fluid circulates therethrough, said method comprising:

a) placing a vibration sensor in vibration contact with said valve;

b) placing a pressure sensor in pressure contact with said fluid for sensing the pressure of said fluid upstream said valve;

c) converting into respective electrical signals the vibrations sensed by said vibration sensor and said upstream pressure sensed by said pressure sensor;

wherein said method comprises the following calibration steps:

d) recording the electrical signal corresponding to sensed vibrations for a predetermined pressure difference upstream and downstream said pressure reducing valve, and for a predetermined flow of fluid through said valve;

e) repeating step (d) for different predetermined flows of fluid and for different predetermined pressures of fluid upstream said valve, the pressure downstream said valve being assumed to be substantially constant;

f) storing in memory means data representative of variations of electrical signals corresponding to vibrations of said valve as a function of the different predetermined flows of fluid therethrough;

wherein, after said calibration steps, said method comprises the following operational steps:

g) recording electrical signals corresponding to sensed values of pressure and vibration supplied by said upstream sensor and said vibration sensor, respectively; and h) correlating said respective electrical signals with the flow of the fluid to be determined as a function of said data stored in said memory means.

6. A method of determining the flow of a compressible fluid through a conduit, said conduit being provided with a pressure reducing valve for emitting vibrations when said fluid circulates therethrough, said method comprising:

a) placing a vibration sensor in vibration contact with said valve;

b) placing a differential pressure sensor in pressure contact with said fluid for sensing the pressure of said fluid upstream and downstream said valve, and for obtaining the difference between said upstream and downstream pressures;

c) converting into respective electrical signals vibrations sensed by said vibration sensor and pressure differences obtained from said differential pressure sensor;

wherein said method comprises the following calibration steps:

d) recording the electrical signal corresponding to sensed vibrations for a predetermined pressure difference upstream and downstream said pressure reducing valve, and for a predetermined flow of fluid though said valve;

e) repeating step (d) for different predetermined flows of fluid and for different predetermined pressure differences of fluid upstream and downstream said valve;

f) storing in memory means data representative of variations of electrical signals corresponding to vibrations of said valve as a function of the flow of fluid therethrough:

wherein, after said calibration steps, said method comprises the following operational steps:

g) recording electrical signals corresponding to sensed values of pressure and vibration supplied by said differential pressure sensor and said vibration sensor, respectively; and h) correlating said electrical signals with the flow of the fluid to be determined as a function of said data stored in said memory means.

7. Method according to claim 5, further comprising the following steps between steps (c) and (d):

amplifying the electrical signal corresponding to said vibrations sensed by said vibration sensor;

setting a predetermined value for the reference threshold of said signal;

passing said signal through a pass-band filter; and rectifying said filtered signal.

8. Method according to claim 6 further comprising the following steps between steps (c) and (d):

amplifying the electrical signal corresponding to said vibrations sensed by said vibration sensor;

setting a predetermined value for the reference threshold of said signal;

passing said signal through a pass-band filter; and rectifying said filtered signal.

* * * * *

UNITED STATES PATENT AND TRADEMARK OFFICE
CERTIFICATE OF CORRECTION

PATENT NO. : 5,058,437
DATED : October 22, 1991
INVENTOR(S) : Claude Chaumont, et al.

It is certified that error appears in the above-identified patent and that said Letters Patent is hereby corrected as shown below:

ON THE TITLE PAGE: Item [75]

The names of the inventors should be as follows:

--Claude Chaumont, Villetaneuse; Maurice D. Waroux, Saint Martin du Tertre; Paul Bonneric, Aubervilliers; Bernard Jannin, Tournan en Brie, all of France.--

Signed and Sealed this

Second Day of March, 1993

Attest:

STEPHEN G. KUNIN

Attesting Officer

Acting Commissioner of Patents and Trademarks